US012349196B2

(12) United States Patent
Yerramalli et al.

(10) Patent No.: US 12,349,196 B2
(45) Date of Patent: Jul. 1, 2025

(54) ROBUST RANDOM ACCESS RESPONSE

(71) Applicant: QUALCOMM Incorporated, San Diego, CA (US)

(72) Inventors: Srinivas Yerramalli, San Diego, CA (US); Xiaoxia Zhang, San Diego, CA (US); Ozcan Ozturk, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 16/672,999

(22) Filed: Nov. 4, 2019

(65) Prior Publication Data
US 2020/0146071 A1 May 7, 2020

Related U.S. Application Data

(60) Provisional application No. 62/757,014, filed on Nov. 7, 2018.

(51) Int. Cl.
H04W 74/0833 (2024.01)
H04W 24/08 (2009.01)
H04W 72/044 (2023.01)
H04W 76/11 (2018.01)

(52) U.S. Cl.
CPC ....... H04W 74/0833 (2013.01); H04W 24/08 (2013.01); H04W 72/046 (2013.01); H04W 76/11 (2018.02)

(58) Field of Classification Search
CPC . H04W 74/0833; H04W 76/11; H04W 24/08; H04W 72/046
See application file for complete search history.

(56) References Cited

U.S. PATENT DOCUMENTS

| 2014/0177607 | A1* | 6/2014 | Li | H04W 52/146 |
| | | | | 370/336 |
| 2015/0230263 | A1* | 8/2015 | Roy | H04W 36/00837 |
| | | | | 455/452.2 |
| 2017/0251460 | A1* | 8/2017 | Agiwal | H04W 72/20 |
| 2017/0303317 | A1* | 10/2017 | Islam | H04W 74/0833 |
| 2017/0367120 | A1* | 12/2017 | Murray | H04W 74/0833 |
| 2018/0042000 | A1* | 2/2018 | Zhang | H04W 72/23 |
| 2018/0049068 | A1* | 2/2018 | Agiwal | H04W 74/0833 |

(Continued)

FOREIGN PATENT DOCUMENTS

WO WO-2018008918 A1 1/2018

OTHER PUBLICATIONS

International Search Report and Written Opinion—PCT/US2019/059898—ISA/EPO—Feb. 17, 2020.

Primary Examiner — Chuong M Nguyen
(74) Attorney, Agent, or Firm — Arun Swain

(57) ABSTRACT

A robust random access response mechanism is disclosed. In various aspects of the disclosure, a user equipment (UE) initiates the random access connection procedure by transmitting a random access preamble to a base station. The base station may be configured to transmit a random access response message on any one or more of a plurality of transmission resources. The UE may then monitor each of the transmission resources for the random access response message from the base station. The UE may then establish the communication connection with the base station based on the random access response message.

24 Claims, 8 Drawing Sheets

(56) References Cited

U.S. PATENT DOCUMENTS

| | | | |
|---|---|---|---|
| 2018/0062770 A1* | 3/2018 | Reial | H04B 7/063 |
| 2018/0279284 A1* | 9/2018 | Wang | H04W 24/10 |
| 2018/0287686 A1* | 10/2018 | John Wilson | H04B 7/0632 |
| 2018/0302889 A1* | 10/2018 | Guo | H04L 5/0051 |
| 2018/0324853 A1* | 11/2018 | Jeon | H04W 74/006 |
| 2018/0359783 A1* | 12/2018 | Abedini | H04W 24/02 |
| 2018/0359790 A1* | 12/2018 | Ingale | H04W 72/51 |
| 2019/0037604 A1* | 1/2019 | Akkarakaran | H04W 74/0833 |
| 2019/0230696 A1 | 7/2019 | Kim et al. | |
| 2019/0306847 A1* | 10/2019 | Seo | H04W 72/046 |
| 2019/0350028 A1* | 11/2019 | Kaasalainen | H04W 76/11 |
| 2020/0275319 A1* | 8/2020 | Murray | H04B 7/0617 |
| 2020/0322948 A1 | 10/2020 | Xue et al. | |
| 2020/0374921 A1* | 11/2020 | Li | H04W 72/046 |
| 2020/0404700 A1* | 12/2020 | Li | H04B 7/0695 |

\* cited by examiner

ROBUST RANDOM ACCESS RESPONSE

CROSS-REFERENCE TO RELATED APPLICATIONS

This application claims the benefit of U.S. Provisional Patent Application No. 62/757,014, entitled, "ROBUST RANDOM ACCESS RESPONSE," filed on Nov. 7, 2018, which is expressly incorporated by reference herein in its entirety.

BACKGROUND

Field

Aspects of the present disclosure relate generally to wireless communication systems, and more particularly, to a robust random access response mechanism.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes transmitting, by a user equipment (UE), a random access preamble to a base station to establish a communication connection with the base station, monitoring, by the UE, a plurality of transmission resources for a random access response message from the base station, and establishing, by the UE, the communication connection with the base station based on the random access response message.

In an additional aspect of the disclosure, an apparatus configured for wireless communication includes means for transmitting, by a UE, a random access preamble to a base station to establish a communication connection with the base station, means for monitoring, by the UE, a plurality of transmission resources for a random access response message from the base station, and means for establishing, by the UE, the communication connection with the base station based on the random access response message.

In an additional aspect of the disclosure, a non-transitory computer-readable medium having program code recorded thereon. The program code further includes code to transmit, by a UE, a random access preamble to a base station to establish a communication connection with the base station, code to monitor, by the UE, a plurality of transmission resources for a random access response message from the base station, and code to establish, by the UE, the communication connection with the base station based on the random access response message.

In an additional aspect of the disclosure, an apparatus configured for wireless communication is disclosed. The apparatus includes at least one processor, and a memory coupled to the processor. The processor is configured to transmit, by a UE, a random access preamble to a base station to establish a communication connection with the base station, to monitor, by the UE, a plurality of transmission resources for a random access response message from the base station, and to establish, by the UE, the communication connection with the base station based on the random access response message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
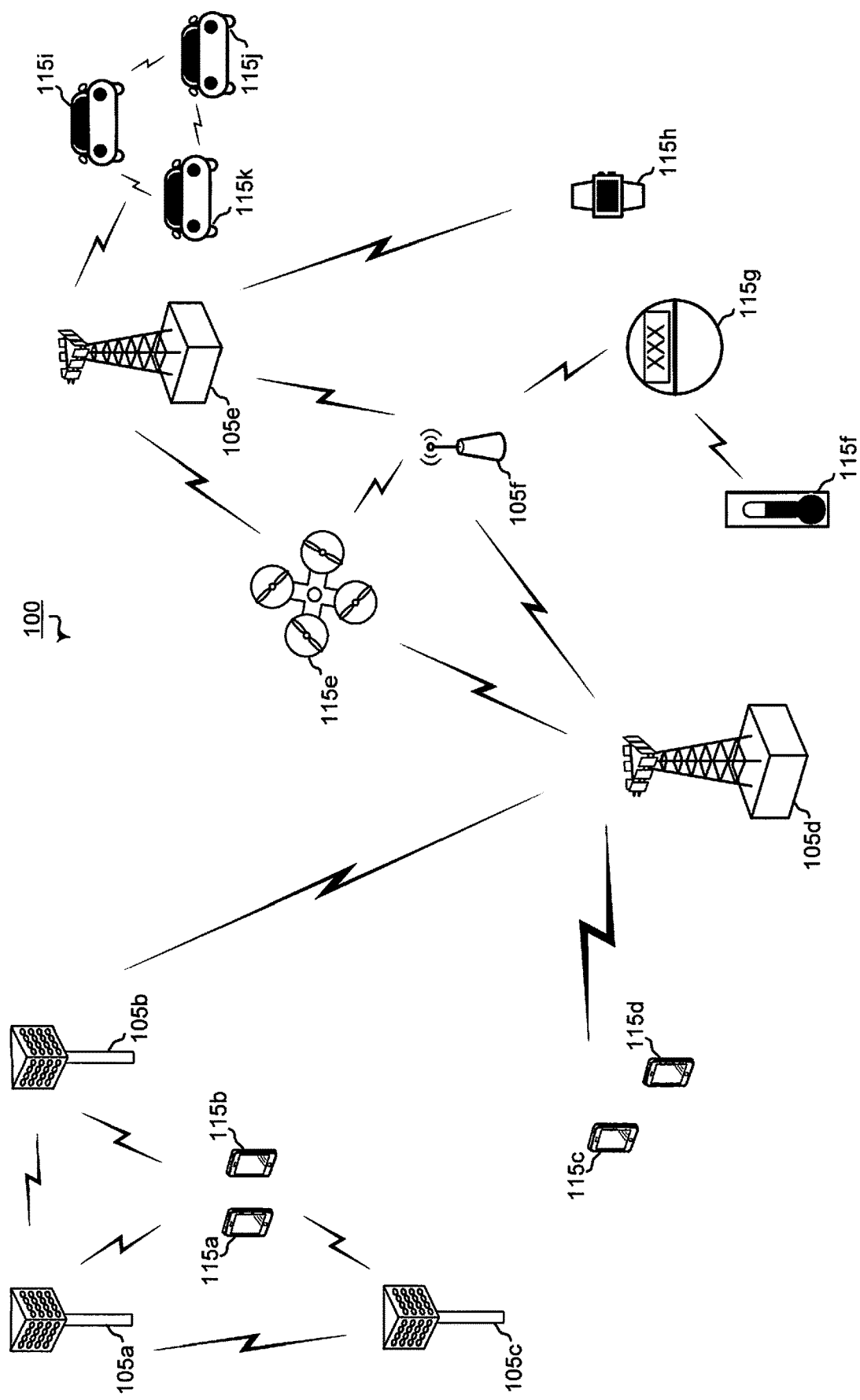
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TIDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDI) over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
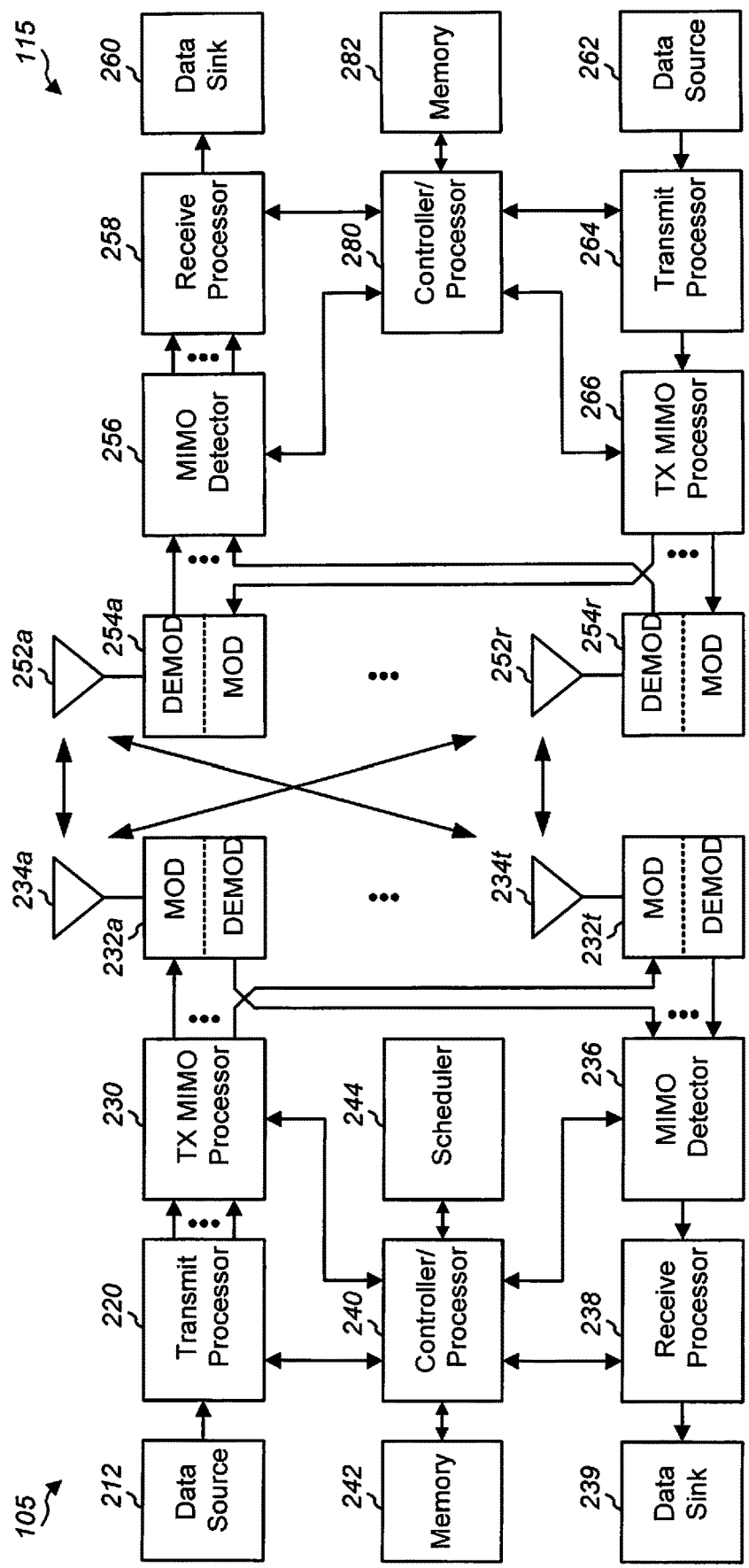
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
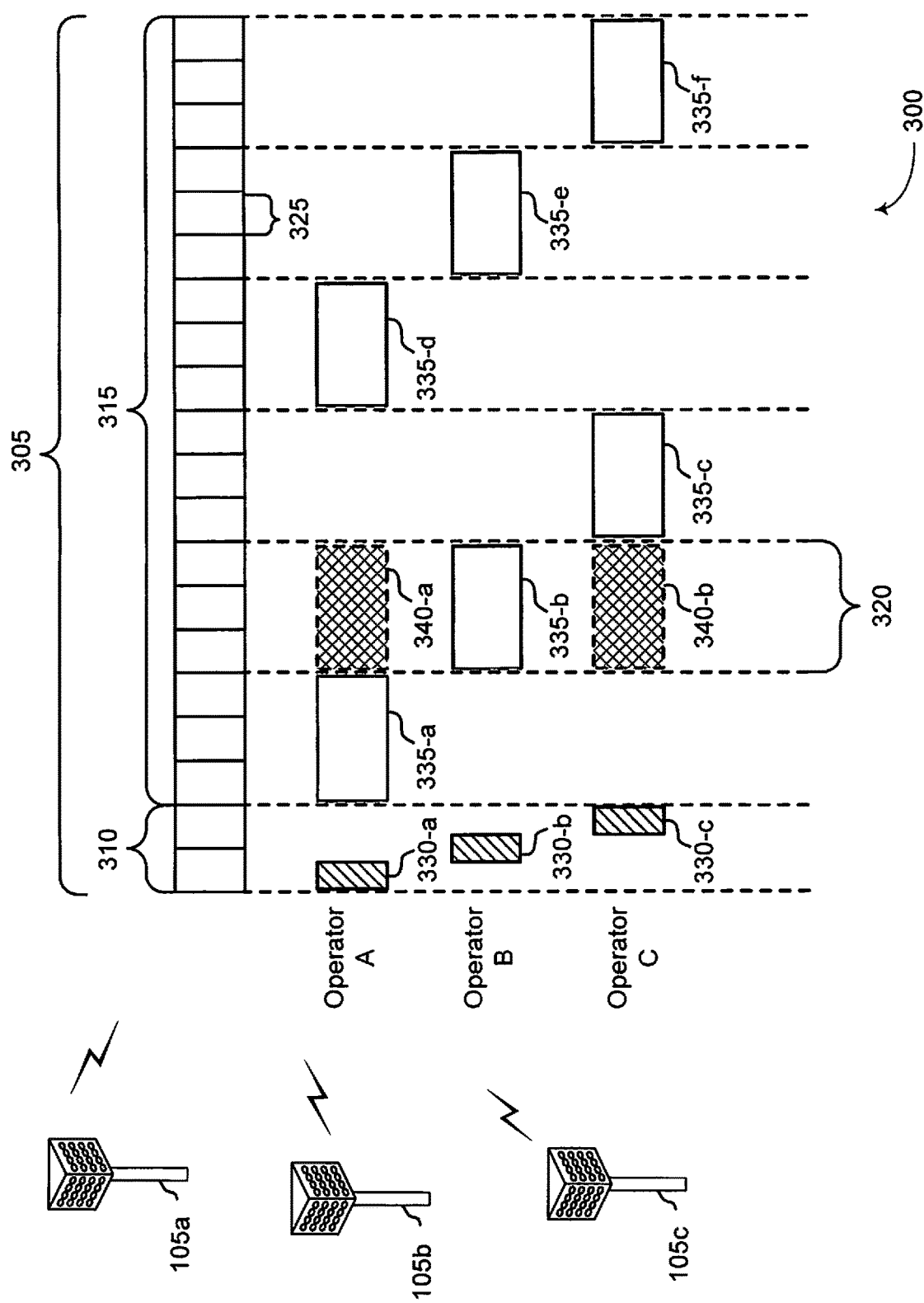
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c may be prioritized for Operator C (e.g., G-INT-OpC), resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

The random access process sequence between a UE and a base station provides the signaling for the UE to acquire uplink synchronization and obtain the specified identifier (ID) for radio access communication on the network. In general, the random access process may be configured as a 4-step process or a 2-step process. As is well known in wireless communications, the 4-step process includes a sequence of four messages between the UE and a base station that requests and establishes a communication connection between the UE and the network through the base station. In an abbreviated description, message 1 (Msg 1) from the UE provides the random access preamble on random access resources. The base station monitors for such random access preambles on the random access resources. If successfully received and decoded, the base station transmits message 2 (Msg 2) which includes the random access response (RAR). The RAR message may include information such as timing advance and a resource grant for further uplink transmissions, such as message 3. After obtaining the configuration information and resource grant of Msg 2, the UE would send message 3 (Msg 3), which includes a connection request for connecting to the network. At message 4 (Msg 4), where potential collisions may occur between UEs attempting access using the same random access preamble, a contention resolution ID may be transmitted by the base station to allow contention resolution between multiple UEs attempting access to the network.

The random access process may also be contention free in some network implementations. In such contention free network configurations, the base station would initially configure the UE with an assignment of a particular random access preamble. Such configuration may occur through higher layer signaling, such as RRC signaling, or for example, during handover or other mobility related event, or through a lower layer trigger from the base station, such as a PDCCH order grant for restoring uplink synchronization. Where the UE has been assigned a random access preamble, there will be less of a likelihood of a preamble collision. Thus, Msg 4 may be unnecessary or may not include any contention resolution information.

The 2-step random access process provides the same communications and information as the 4-step process, but provides this information in two messages: message A (Msg A) from the UE to the base station, which includes the random access preamble (Msg 1) and the connection request (Msg 3); and message B (Msg B) from the base station to the UE, which includes the RAR message (Msg 2) and any contention resolution or further uplink grant (Msg 4). In some implementations of a 2-step random access process, where either the UE or the base station continue to fail to successfully decode any of Msg A or B or any of the information within Msg A or B, the system will fall back to the 4-step random access process.

In the 4-step random access procedure, indication of a preferred beam by the UE in Msg 3 has been suggested so that the larger payload of Msg 4 can be optimally received by the UE. Note that in current practice of the 4-step random access process, because the first uplink message identified for carrying a payload is Msg 3, Msg 3 would be the first uplink message that could hold an indication of the preferred for receiving subsequent messages. Msg 3 itself would be transmitted on the same beam as Msg 1. Any beam that is above a certain RSRP threshold configured in RMSI may be considered a valid beam to transmit random access messages. However, using random access resources for the highest quality beam could incur a significant delay. Various aspects of the present disclosure are directed to configuring the base station to transmit the random access response message (e.g., Msg 2 or Msg B) one or more transmission resources according to a best accessible resource.

Figure 4:
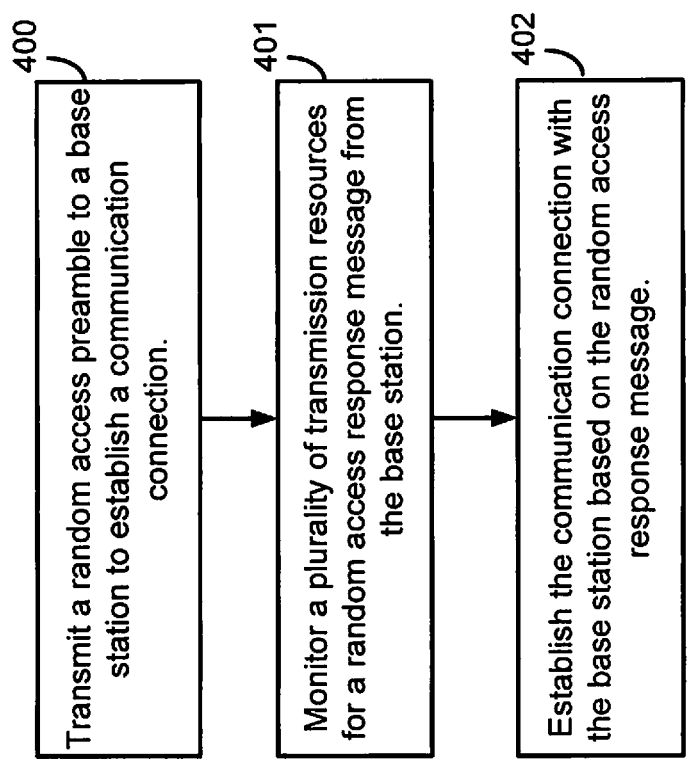
FIG. 4 is a block diagram illustrating example blocks executed to implement one aspect of the present disclosure.
Figure 8:
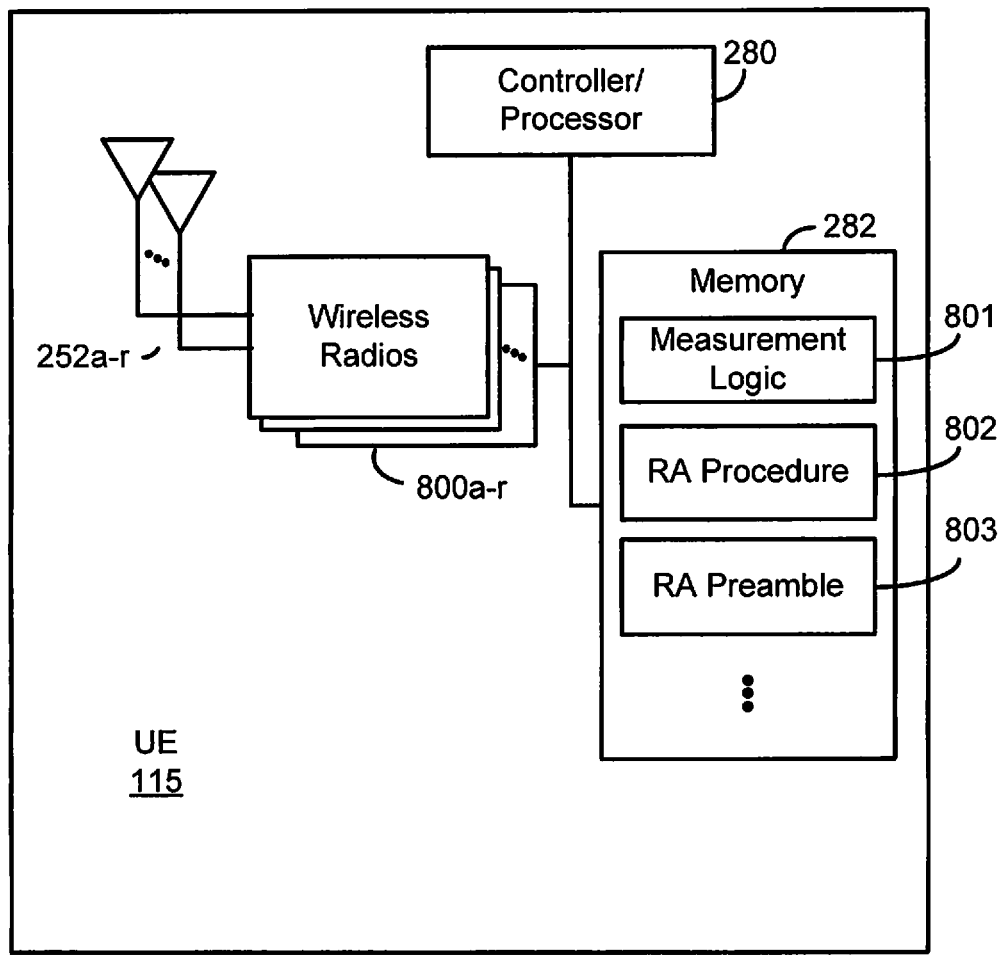
FIG. 8 is a block diagram illustrating a UE configured according to one aspect of the present disclosure.

FIG. 4 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE transmits a random access preamble to a base station to establish a communication connection with the base station. For example, when a UE, such as UE 115 determines to begin a random access procedure, whether to establish a communication connection or to synchronize transmissions with the network, UE 115, under control of controller/processor 280, executes random access procedure logic 802, stored in memory 282. The execution environment of random access procedure logic 802 provides the functionality for transmitting and receiving/decoding the messages from a base station (e.g., 4-step random access or 2-step random access). Within the execution environment of random access procedure logic 802, UE 115 generates a first random access message including a preamble identified in memory 282 at random access preamble 803. UE 115 transmits the first message (e.g., Msg 1 or Msg A) including the preamble via wireless radios 800a-r and antennas 252a-r.

At block 401, the UE monitors a plurality of transmission resources for a random access response message from the base station. Part of the functionality enabled through the execution environment of random access procedure logic 802 is the identification of multiple transmission resources on which the responding random access message from the base station may be received. In selected aspects, UE 115 may, under control of controller/processor 280, execute measurement logic 801, stored in memory 282. The execution environment of measurement logic 801 allows UE 115 to rank the available transmission resources. In such selected aspects, UE 115 may include an indication of a preferred transmission resource with the preamble in the first message. The resources identified for monitoring by UE 115 through the execution environment of random access procedure logic 802 may include this preferred transmission resource. UE 115 would listen for signals on the monitored transmission resources via antennas 252a-r and wireless radios 800a-r.

At block 402, the UE establishes the communication connection with the base station based on the random access response message. After completing all of the random access messaging, as managed within the execution environment of random access procedure logic 802, UE 115 may establish a communication connection, including re-synchronization with the network for uplink communications.

Figures 5A, 5B:
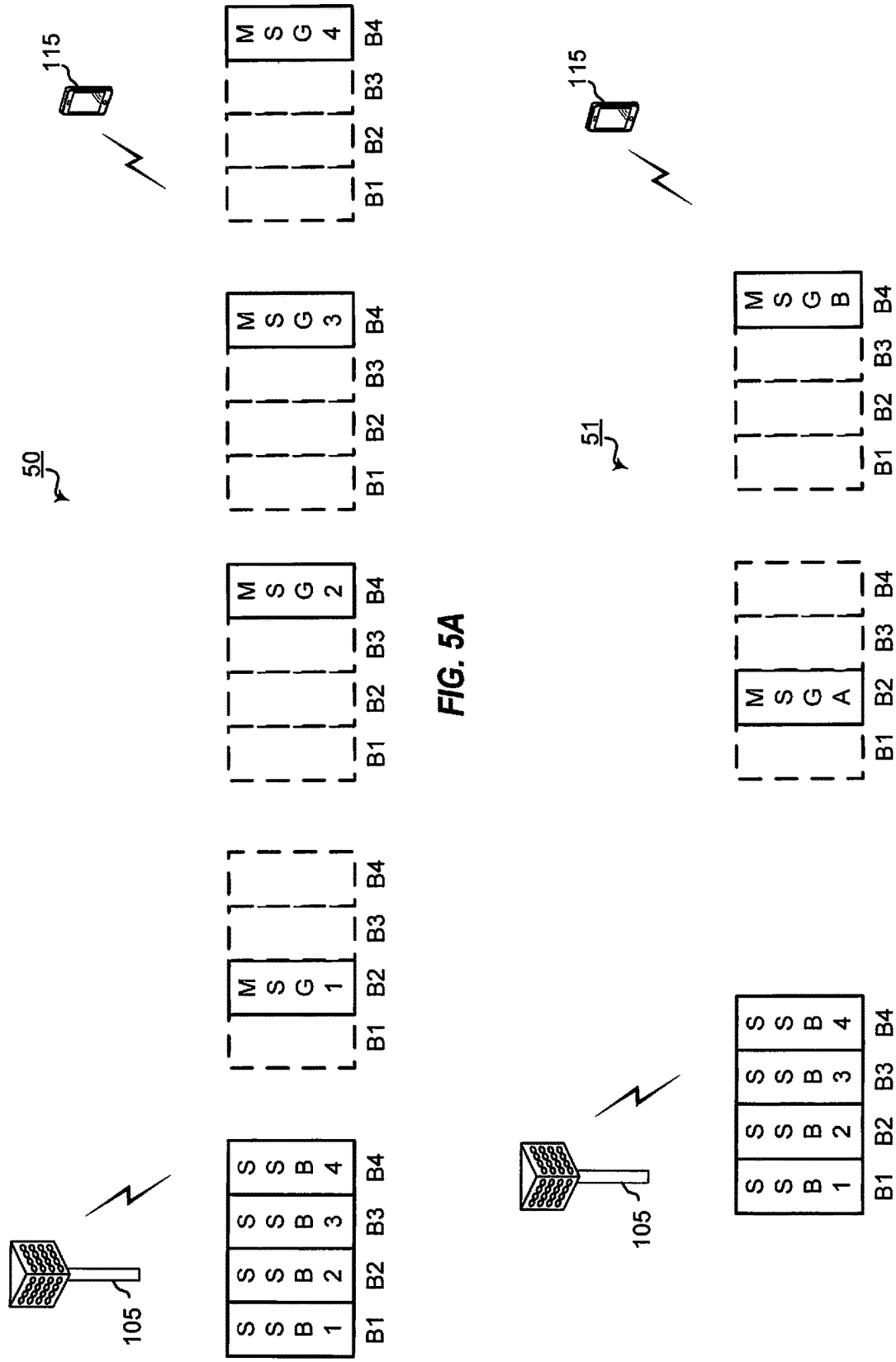
FIGS. 5A and 5B are block diagrams illustrating a wireless network having a base station and UE, each configured according to one aspect of the present disclosure.

FIG. 5A is a block diagram illustrating a wireless network 50 having base station 105 and UE 115, each configured according to one aspect of the present disclosure. Within the illustrated configuration of wireless network 50, base station 105 and UE 115 are configured to perform a 4-step random access process for UE 115 to establish a communication connection to the network. Base station 105 and UE 115 may communicate using multiple transmission beams, such as used in millimeter wave (mmW) communications. UE 115 may determine the quality of the available beams by measuring the RSRP of the synchronization signal blocks (SSB1-4) transmitted in each of beams B1-B4. According to the RSRP measurements, UE 115 may determine that B2 and B3 exceed the minimum threshold quality measurement, while B1 measures to be unsuitable for transmission by UE 115 and B4 measures to be the best available beam for communications with UE 115. However, the first available random access resources for UE 115 are beam B2. Because B2 is a suitable beam for transmissions, UE 115 transmits Msg 1 of the random access procedure using beam B2.

According to the illustrated aspect, UE 115 also includes an indication of a preferred beam, B4, in Msg 1. Base station 105 receives the Msg 1 random access preamble and preferred beam indication from UE 115 and transmits the Msg 2 RAR message to UE 115 using the preferred beam, B4. The remaining messages of the 4-step random access procedure (Msg 3 & Msg 4) will then be transmitted using the preferred beam, B4.

FIG. 5B is a block diagram illustrating a wireless network 51 having base station 105 and UE 115, each configured according to one aspect of the present disclosure. In the example illustrated in FIG. 5B, wireless network 51 configures base station 105 and UE 115 to use a 2-step random access procedure for UE 115 to establish a communication connection with the network via base station 105. According to the illustrated aspect, UE 115, to initiate the random access procedure, sends Msg A, including the random access preamble and the preferred beam indication, via beam B2, as the first available suitable random access resource. Upon receiving Msg A, base station 105 may decode not only the random access preamble, but the preferred beam indication included therewith. If successfully decoded, base station 105 may then send Msg B using the preferred beam, B4.

For the 2-step random access procedure, UE 115 transmits Msg A on a good enough beam, B2, and receives Msg B on the preferred beam, B4. Msg A of the 2-step random access procedure is expected to itself consist of two components: a preamble sequence and a payload component. The payload component of Msg A carries the preferred beam indication while UE 115 transmits Msg A on the first available suitable beam, B2. Base station 105 might fail in the decoding of the payload but may detect the preamble transmission from UE 115. On the UE side, because of the uncertainty of the decoding by base station 105, UE 115 is configured to monitor for downlink transmission of Msg B on both the preferred beam, B4, and the suitable beam, B2. If base station 105, in fact, successfully detects the payload, it can transmit Msg B on the preferred beam, B4, as illustrated. Otherwise, if base station 105 fails to successfully detect the payload but detects a preamble, then base station 105 may transmit Msg B (or Msg 2 for the fallback 4-step random access process) on the same beam, B2, on which it received Msg A.

It should be noted that UE 115 may be configured to simultaneously monitor beams B2 and B4 or may be configured to monitor beams B2 and B4 according to a monitoring pattern (e.g., time division multiplex (TDM) monitoring, time-interleaving, etc.) on the two beams, B2 and B4. The monitoring pattern may be configured by base station 105, such as part of an RRC configuration message for random access resources (e.g., random access channel (RACH) resources). UE 115 would wait until the RAR window expires before restarting the random access procedure.

Figure 6:
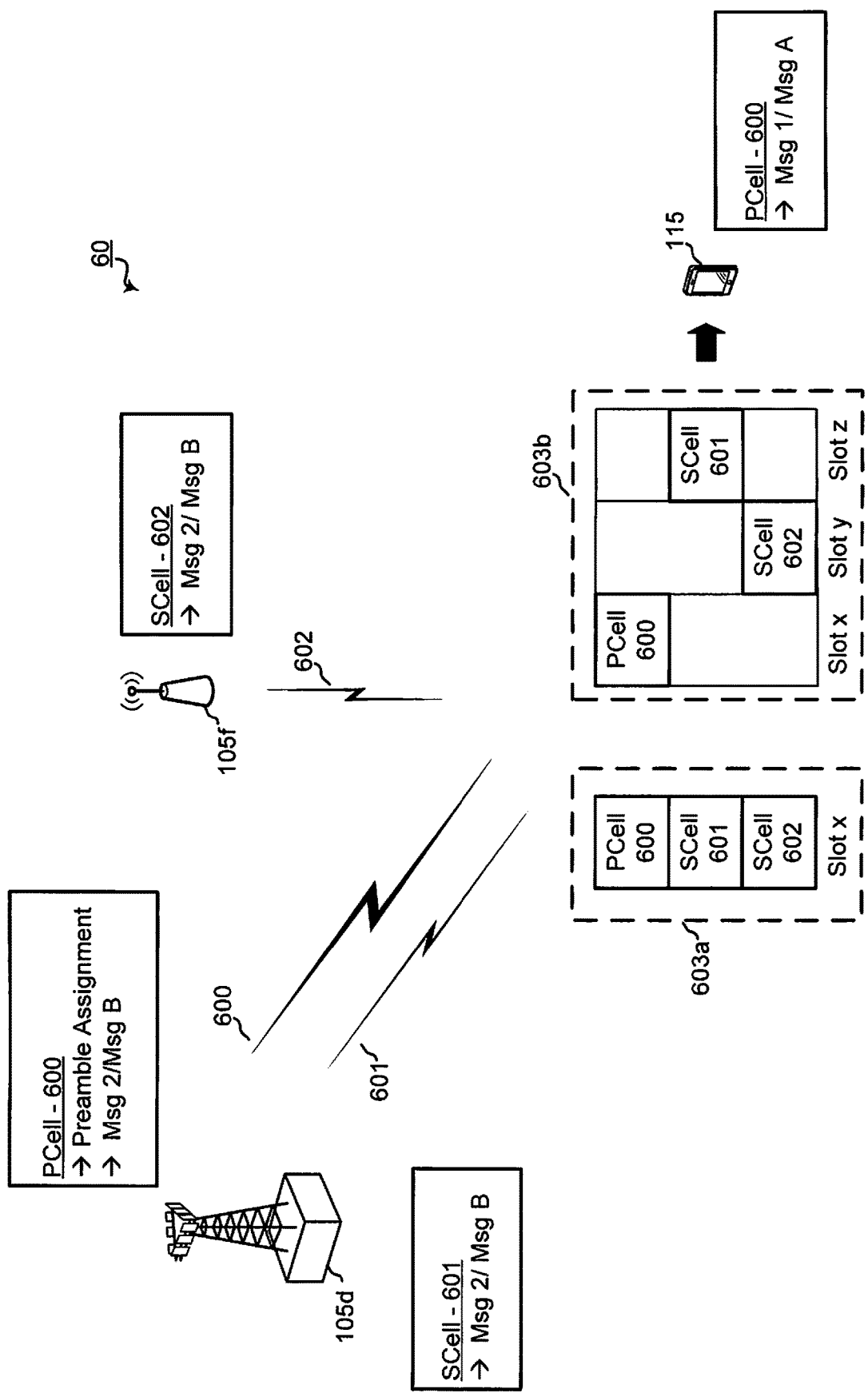
FIG. 6 is a block diagram illustrating a wireless network having base stations and a UE configured for contention free random access (CFRA) according to one aspect of the present disclosure.

FIG. 6 is a block diagram illustrating a wireless network 60 having base stations 105d, 105f, and UE 115 configured for contention free random access (CFRA) according to one aspect of the present disclosure. UE 115 may establish a communication connection with the network through base station 105d via primary cell (PCell) 600 or secondary cell (SCell) 601, operated via base station 105d, or SCell 602, operated by base station 105f, either independently or through communications coordinated by base station 105d. For CFRA, base station 105d may send UE 115 a PDCCH order grant in either PCell 600 or one of SCells 601 or 602, and UE 115 will transmit random access messages on that cell. However, due to legacy design constraints, the RAR message would typically be received on PCell 600.

For CFRA in a connected mode, base station 105f transmits the random access preamble assignment via PCell 600 to UE 115. The assignment of the random access preamble creates the contention free access environment. When UE 115 desires to establish a communication connection, it may transmit random access Msg 1 (4-step) or Msg A (2-step) on PCell 600 to initiate the connection process. According to the illustrated aspect, base station 105f further configures the RAR message of Msg 2 (4-step) or Msg A (2-step) to be transmitted either on PCell 600 or on one or more of SCells 601 or 602.

The communications in wireless network 60 share access to available communication spectrum. Thus, before transmitting any messages or signals, each network entity would perform a listen before talk (LBT) procedure to secure access to the shared communication spectrum. Where such LBT procedure fails on PCell 600 or PCell 600 becomes overloaded, the RAR message of Msg 2 (4-step) or Msg B (2-step) can be transmitted on one or both of SCells 601 and 602. However, because of the uncertainty of LBT success, UE 115 is configured to monitor the common search space on PCell 600 as well as SCells 601 and 602 for the RAR message. The RAR message of Msg 2/Msg B may be scrambled with a temporary identifier (ID) for random access or the cell for a beam failure indication message (e.g., random access radio network temporary ID (RA-RNTI), cell RNTI (C_RNTI) or the like). The opportunity for Msg 2/Msg B to be on any of PCell 600 or SCells 601 or 602 increases blind decodes and control channel element (CCE) monitoring at UE 115. However, because the LBT procedure is dynamic, UE 115 may be configured to monitor the different cells according to various monitoring patterns.

For example, one example monitoring pattern 603a may configure UE 115 to simultaneously monitor PCell 600 and SCells 601 and 602 in a given slot, slot x. Such simultaneous monitoring may be dependent on the capabilities of UE 115. UE 115 may have limited wireless radios for driving communications, and, thus, may not be capable of simultaneously monitoring more than one cell at a time. In an alternative pattern, monitoring pattern 603b, UE 115 may be configured to monitor PCell 600 and SCells 601 and 602 in a time-interleaved or time division multiplex (TDM) pattern. Thus, UE 115 may be configured to monitor PCell 600 at slot x, SCell 602 at slot y, and SCell 601 at slot z. These configurations for UE 115 to monitor multiple cells according to a monitoring pattern ensures that even if transmissions on one of PCell 600 or SCells 601 and 601 does not succeed, the other cell can carry the RAR message in Msg 2/Msg B.

Figure 7:
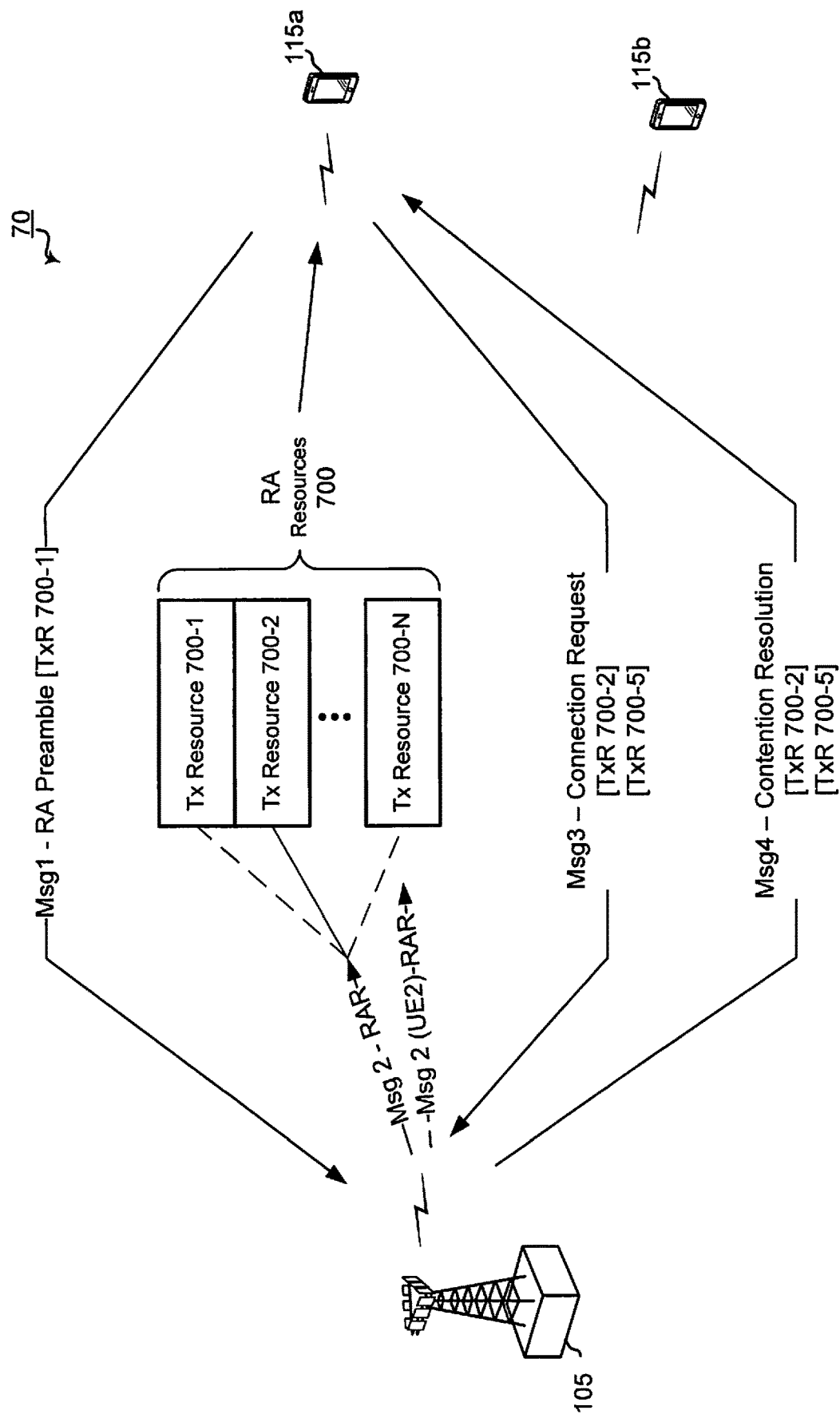
FIG. 7 is a block diagram illustrating a wireless network having base stations and a UE configured for contention based random access (CBRA) according to one aspect of the present disclosure.

FIG. 7 is a block diagram illustrating a wireless network 70 having base stations 105 and UEs 115a and 115b configured for contention based random access (CBRA) according to one aspect of the present disclosure. Access to wireless network 70 may occur via shared communication spectrum, including random access resources 700, including transmission resources 700-1-700-N. Transmission resources 700-1-700-N may comprise multiple cells, as illustrated and described with respect to FIG. 6, or may be multiple bandwidth parts (BWPs) of a system bandwidth, or may be multiple subbands of the same BWP in a cell.

In operation, UE 115a intends to initiate a connection to wireless network 70 and transmits Msg 1 including a random access preamble on transmission resource 700-1. Upon successfully receiving and decoding Msg 1 and the random access preamble, base station 105 will transmit Msg 2 with the RAR message. According to the various aspects of the present disclosure, base station 105 may be configured to transmit Msg 2 on any of transmission resources 700-1-700-N. Thus, UE 115a may be configured to monitor each of transmission resources 700-1-700-N for Msg 2. UE 115a may monitor transmission resources 700-1-700-N according to a monitoring pattern, as noted above. For example, UE 115a may monitor each resource simultaneously, depending on capability, or according to TDM pattern.

As a part of the RAR message of Msg 2, base station 105 also grants uplink resources to UE 115a for Msg 3. In the illustrated aspect, Msg 2 includes multiple uplink grants for Msg 3 on different transmission resources to improve uplink reliability. Accordingly, UE 115a transmits Msg 3 with the connection request on transmission resources 700-2 and 700-5. Similarly, base station 105 may transmit the contention resolution information (e.g, contention resolution ID, etc.) in Msg 4 on multiple transmission resources. As illustrated, base station 105 transmits Msg 4 to UE 115a on transmission resource 700-2 and 700-5.

For CBRA, there may be instances in which different UEs, such as UE 115a and 115b, use the same random access preamble ID (RAPID) on the two different cells. In such instances, Msg 2 and the RAR message from base station 105 would be the same for both UE 115a and 115b. In order to address this collision, one example aspect of the present disclosure provides for a cell-based scrambling partition. In such example aspect, base station 105 would generate two separate RAR messages for Msg 2, each RAR message would be scrambled according to the temporary network ID associated with the cells of each of UE 115a and UE 115b. Thus, base station 105 would scramble the RAR message for UE 115a with the RA-RNTI associated with the cell where UE 115a is located, and scrambles the RAR message for UE 115b with the RA-RNTI associated with the cell where UE 115b is located.

In a second example aspect, base station 105 generates the RAR message to indicate the random access preamble ID (RAPID) and the cell index on which it received the RAPID. Thus, even where UE 115a and 115b were to use the same RAPID in transmitting the random access preamble in their respective Msg 1 transmissions, the addition of the cell index would allow UE 115a and UE 115b to differentiate which RAR message of Msg 2 is directed to them. In an additional example aspect, UE 115a and UE 115b may be configured to monitor for the Msg 2 RAR message from any of transmission resources 700-1-700-N at a different slot or time, which would eliminate the chance of Msg 2 collision through base station scheduling.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   determining, by the UE, which of a plurality of beams satisfy a predefined condition to be part of a subset of the plurality of beams that are suitable for use by the UE for transmissions during an access process by which the UE joins a communication system of a base station;
   identifying, by the UE, one of the subset of beams as being a preferred beam;
   selecting, by the UE, another one of the subset of beams, which is a non-preferred beam, from the subset of beams for transmission by the UE to the base station;
   based on the selection, transmitting, by the UE and via the non-preferred beam, a random access preamble to the base station to establish a communication connection with the base station for the joining by the UE of the communication system of the base station, wherein:
      the random access preamble includes a preferred beam indication that identifies the preferred beam; and
      the base station is configured to transmit a random access response message to the UE as part of the access process in response to the random access preamble (a) using the preferred beam where the base station successfully decodes the identification of the preferred beam transmitted by the UE and (b) where the identification of the preferred beam is not successfully decoded by the base station, using the non-preferred beam based on the random access preamble having been transmitted by the UE via the non-preferred beam, so that there is an uncertainty by the UE of with which of the non-preferred beam and the preferred beam the random access response will be received by the UE;
   due to the uncertainty, monitoring, based on a monitoring pattern included in a random access configuration message received from the base station, the non-preferred beam and the preferred beam for a random access response message from the base station, wherein the monitoring is performed by monitoring the non-preferred beam and the preferred beam with a temporal sequence indicated by the monitoring pattern that the UE received from the base station; and
   establishing, by the UE, the communication connection with the base station based on the random access response message.

2. The method of claim 1, wherein the random access preamble with the preferred beam indication are transmitted in a first random access message from the UE to the base station.

3. The method of claim 1, wherein the monitoring of the non-preferred beam and the preferred beam includes monitoring a plurality of transmission resources, and wherein the plurality of transmission resources includes one of:
   a primary cell and one or more secondary cells;
   a plurality of bandwidth parts within a cell; or
   a plurality of subbands within a bandwidth part.

4. The method of claim 3, further including:
   receiving a preamble configuration message from the base station, wherein the preamble configuration message assigns the UE a preamble for the random access preamble, wherein the monitoring includes monitoring a common search space of each of the plurality of transmission resources.

5. The method of claim 4, wherein the random access preamble and a connection request message are transmitted in a first random access message from the UE to the base station on one of the plurality of transmission resources.

6. The method of claim 3, further including:
   transmitting a connection request to the base station in response to detection of the random access response message during the monitoring, wherein the random access response message includes one or more uplink grants identifying uplink resources for transmission of the connection request from the UE on one or more cells; and
   receiving a contention resolution identifier (ID) acknowledging receipt of the connection request, wherein the contention resolution ID is received via the one or more cells.

7. The method of claim 6, wherein:
   the random access preamble and a connection request message are transmitted in a first random access message from the UE to the base station on one of the plurality of transmission resources, and
   the random access response message and a contention resolution identifier (ID) are received in a second random access message from the base station to the UE on an accessible one of the plurality of transmission resources.

8. The method of claim 6, wherein the monitoring includes:

unscrambling the random access response message using a temporary identifier associated with a cell on which the UE transmitted the random access preamble.

9. The method of claim 6, wherein the monitoring includes:
identifying indications of a random access preamble identifier (RAPID) and a cell identifier (ID) within the random access response message; and
confirming the RAPID and the cell ID indicated in the random access response message correspond to the RAPID transmitted with the random access preamble and a cell on which the random access preamble was transmitted.

10. The method of claim 1, wherein the monitoring of the non-preferred beam and the preferred beam includes monitoring a plurality of transmission resources, and wherein the monitoring includes monitoring, according to a monitoring pattern including one of:
simultaneously monitoring each transmission resource of the plurality of transmission resources; or
monitoring the each transmission resource of the plurality of transmission resources on a time-interleaved sequence.

11. The method of claim 1, wherein the selection of the non-preferred beam is based on the non-preferred beam being available for use by the UE prior to the preferred beam being detected as being available for a transmission to the base station.

12. The method of claim 1, wherein the temporal sequence corresponds to a time division multiplex (TDM) monitoring pattern.

13. The method of claim 1, wherein the temporal sequence corresponds to simultaneously monitoring the non-preferred beam and the preferred beam.

14. The method of claim 1, further comprising:
measuring a reference signal received power (RSRP) value of the plurality of beams, wherein:
the condition is that the RSRP value exceeds a threshold RSRP value;
the identification of the one of the subset of beams as the preferred beam is based on the RSRP value; and
the transmitting is performed via the non-preferred beam instead of the preferred beam, which has been identified, in response to an unavailability of the preferred beam and an availability of the non-preferred beam.

15. An user equipment (UE) configured for wireless communication, the UE comprising:
at least one processor; and
a memory coupled to the at least one processor;
wherein the at least one processor is configured to:
determine which of a plurality of beams satisfy a predefined condition to be part of a subset of the plurality of beams that are suitable for use by the UE for transmissions during an access process by which the UE joins a communication system of a base station;
identify one of the subset of beams as being a preferred beam;
select another one of the subset of beams, which is a non-preferred beam, from the subset of beams for transmission by the UE to the base station;
based on the selection, initiate transmission, by the UE and via the non-preferred beam, a random access preamble to the base station to establish a communication connection with the base station for the joining by the UE of the communication system of the base station, wherein:
the random access preamble includes a preferred beam indication that identifies the preferred beam; and
the base station is configured to transmit a random access response message to the UE as part of the access process in response to the random access preamble (a) using the preferred beam where the base station successfully decodes the identification of the preferred beam transmitted by the UE and (b) where the identification of the preferred beam is not successfully decoded by the base station, using the non-preferred beam based on the random access preamble having been transmitted by the UE via the non-preferred beam, so that there is an uncertainty by the UE of with which of the non-preferred beam and the preferred beam the random access response will be received by the UE;
due to the uncertainty, monitor, based on a monitoring pattern included in a random access configuration message received from the base station, the non-preferred beam and the preferred beam for a random access response message from the base station, wherein the monitoring is performed by the at least one processor monitoring the non-preferred beam and the preferred beam with a temporal sequence indicated by the monitoring pattern that the UE received from the base station; and
establish the communication connection with the base station based on the random access response message.

16. The UE of claim 15, wherein, to monitor the non-preferred accessible beam and the preferred beam for the random access response message from the base station, the at least one processor is further configured to monitor a plurality of transmission resources in accordance with the monitoring pattern, and wherein the plurality of transmission resources includes a primary cell and one or more secondary cells, and wherein the monitoring pattern further indicates to the UE a second temporal sequence to apply to monitor the primary cell and the one or more secondary cells, wherein the second temporal sequences comprises a time division multiplex (TDM) monitoring pattern or a time-interleaving monitoring pattern.

17. The UE of claim 16, wherein the at least one processor is further configured to receive a preamble configuration message from the base station, wherein the preamble configuration message assigns the UE a preamble for the random access preamble, wherein, to monitor the non-preferred accessible beam and the preferred beam for the random access response message from the base station, the at least one processor is configured to monitor a common search space of each of the plurality of transmission resources.

18. The UE of claim 17, wherein the random access preamble and a connection request message are transmitted in a first random access message from the UE to the base station on one of the plurality of transmission resources.

19. The UE of claim 16, wherein the at least one processor is further configured to:
transmit a connection request to the base station in response to detection of the random access response message, wherein the random access response message includes one or more uplink grants identifying uplink resources for transmission of the connection request from the UE on one or more cells; and receive a contention resolution identifier (ID) acknowledging receipt of the connection request, wherein the contention resolution ID is received via the one or more cells.

20. The UE of claim 19, wherein the random access preamble and a connection request message are transmitted in a first random access message from the UE to the base station on one of the plurality of transmission resources, and wherein the random access response message and a contention resolution identifier (ID) are received in a second random access message from the base station to the UE on an accessible one of the plurality of transmission resources.

21. The UE of claim 19, wherein, to monitor the accessible beam and the preferred beam for a random access response message from the base station, the at least one processor is configured to unscramble the random access response message using a temporary identifier associated with a cell on which the UE transmitted the random access preamble.

22. The UE of claim 19, wherein, to monitor the non-preferred beam and the preferred beam for a random access response message from the base station, the at least one processor is configured to:

identify indications of a random access preamble identifier (RAPID) and a cell identifier (ID) within the random access response message; and confirm the RAPID and the cell ID indicated in the random access response message correspond to the RAPID transmitted with the random access preamble and a cell on which the random access preamble was transmitted.

23. The UE of claim 15, wherein, to monitor the non-preferred beam and the preferred beam for a random access response message from the base station, the at least one processor is configured to monitor a plurality of transmission resources, and wherein, to monitor the plurality of transmission resources, the at least one processor is configured to:

simultaneously monitor each transmission resource of the plurality of transmission resources; or monitor each transmission resource of the plurality of transmission resources on a time-interleaved sequence.

24. The UE of claim 15, wherein the selection of the non-preferred beam is based on the non-preferred beam being determined by the at least one processor as being available for use by the UE prior to the preferred beam being detected as being available for a transmission.

* * * * *